United States Patent Office 3,766,259
Patented Oct. 16, 1973

3,766,259
PREPARATION OF 1-ARYL-3-INDENYL
ACETIC ACIDS
Meyer Sletzinger and Donald F. Reinhold, North Plainfield, and Ronald Harmetz, Dover, N.J., assignors to Merck & Co., Inc., Rahway, N.J.
No Drawing. Filed May 1, 1970, Ser. No. 33,971
Int. Cl. C07c 147/00
U.S. Cl. 260—515 A    5 Claims

ABSTRACT OF THE DISCLOSURE

Process for the preparation of 1-benzylidene-3-indenyl aliphatic acid compounds comprising reducing a nitrobenzene to form an aniline which is diazotized and then undergoes a Meerwein reaction and subsequent hydrogenolysis to yield a β-aryl propionic acid which is cyclized, condensed and substituted in the 1-position.

---

This application is a continuation-in-part of U.S. Ser. No. 882,327, filed Dec. 4, 1969, now abandoned.

This invention relates to a process for preparing novel compounds of the formula:

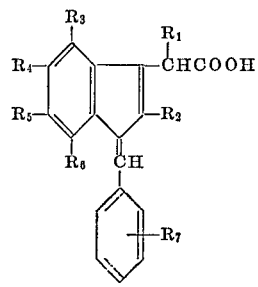

wherein:

$R_1$ may be hydrogen, loweralkyl or halogenated loweralkyl;
$R_2$ may be hydrogen or loweralkyl;
$R_3$, $R_4$, $R_5$ and $R_6$ each may be hydrogen, loweralkyl, loweralkoxy or halogen; and
$R_7$ may be loweralkylsulfinyl or loweralkylsulfonyl.

The 3-indenyl acetic acid compounds prepared by the process of this invention have anti-inflammatory, antipyretic, and analgesic activity and are useful in the treatment of diseases which exhibit pain, fever or inflammation. In the treatment of such diseases these compounds may be administered topically, orally, rectally or parenterally in dosage ranges of from about 0.1 mg. to 50 mg./kg. body weight per day (preferably from about 1 mg. to 15 mg./kg. body weight per day).

It is therefore an advantage of this invention to produce 3-indenyl acetic acid compounds in high yield by use of the process of this invention which comprises the reduction of a substituted nitrobenzene compound to form an aniline compound, the formation of a diazonium salt which then undergoes a Meerwein reaction and subsequent hydrogenolysis to yield the β-aryl propionic acid intermediate compound. This compound is then cyclized and condensed to form a 3-indenyl acetic acid compound which is then substituted in the 1-position to produce the desired compounds.

It should be noted by one skilled in the art that these compounds may be isomerized into their cis and trans isomers by procedures well known in the art. It should be further noted that the cis isomer is generally substantially more active than the trans isomer.

It should be further noted by one skilled in the art that the 1-(p-methylsulfinylbenzylidene)-3-indenyl acetic acid compounds are asymmetric and may be resolved into their (+) and (−) forms by procedures well known in the art.

It should be further noted by one skilled in the art that some of these compounds are polymorphic and may have more than one crystalline structure.

DETAILED DESCRIPTION

The several aspects of this invention may be depicted by the following flow sheets.

In the preparation of the desired 3-indenyl acetic acid compounds, the starting material is a β-aryl propionic acid. This compound is prepared according to the procedure shown in Flow Sheet I. A substituted benzene derivative may be nitrated, as for example by reaction with nitric acid in solvents such as sulfuric acid, acetic acid, acetic anhydride and nitromethane. The reaction temperature should be maintained between 0–25° C. and preferably between 10–15° C. Alternatively the fluoro-substituted nitrobenzene derivatives may be prepared by reacting the appropriately substituted chloronitrobenzene with potassium or sodium fluoride. The nitrobenzene derivative is then catalytically reduced to form the corresponding aniline derivative which may be isolated as the hydrochloride. The aniline is then reacted with sodium nitrite and an acid to form a diazonium salt which then undergoes a Meerwein reaction with an alkyl substituted acrylic acid compound. This resulting compound then undergoes catalytic hydrogenolysis thereby producing the desired β-aryl propionic acid. If a benzaldehyde containing the desired substituents is readily available, the β-aryl propionic acid may be prepared by reacting the benzaldehyde with propionic anhydride.

Equivalents: $R_2$ may be hydrogen or loweralkyl; $R_3$, $R_4$, $R_5$ and $R_6$ each may be hydrogen, loweralkyl, loweralkoxy or halogen.

FLOW SHEET I (I) Preparation of β-aryl propionic acid.

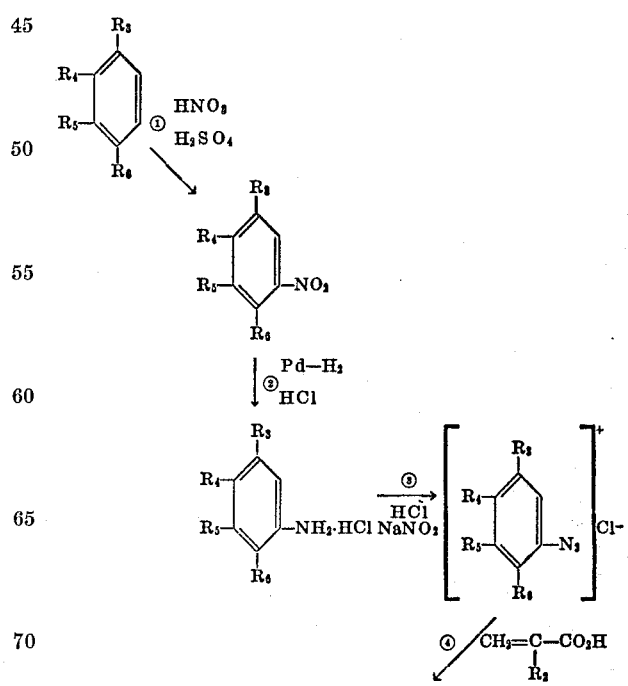

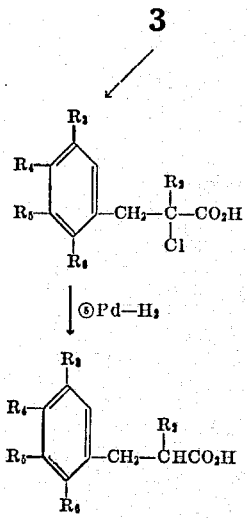

In the preparation of the desired indenyl-3-aliphatic acids, the β-aryl propionic acid compounds are ring closed to form an indanone. The ring closure may be carried out by reacting the β-aryl propionic acid with hydrogen fluoride or polyphosphoric acid. The indanone is then condensed with cyanoacetic (or α-cyanopropionic) acid to introduce the acid side chain in the 3-position. The 1- substituent may be introduced by reacting the 3-indenyl aliphatic acid with an aldehyde or ketone of the desired structure. In the preferred embodiment p-methylthiobenzaldehyde is oxidized to produce p-methylsulfinylbenzaldehyde or p-methylsulfonylbenzaldehyde which is then reacted with the 3-indenyl acetic acid to produce the desired compounds.

Equivalents: $R_1$ is hydrogen, alkyl or halogenated alkyl; $R_2$ may be hydrogen or loweralkyl; $R_3$, $R_4$, $R_5$ and $R_6$ each may be hydrogen, loweralkyl, loweralkoxy or halogen.

FLOW SHEET II (II). Preparation of 1-aryl-3-indenyl acetic acids.

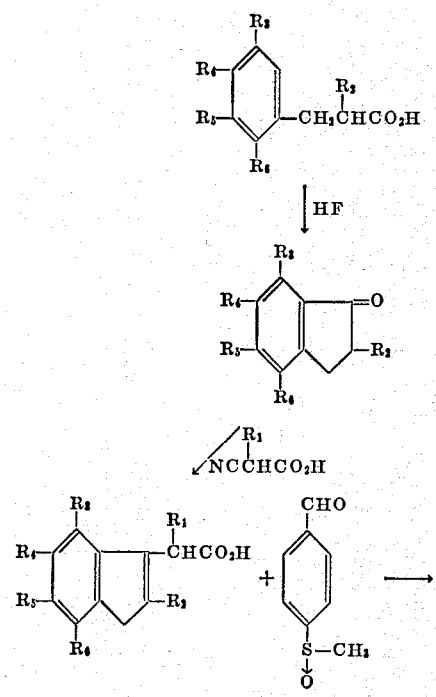

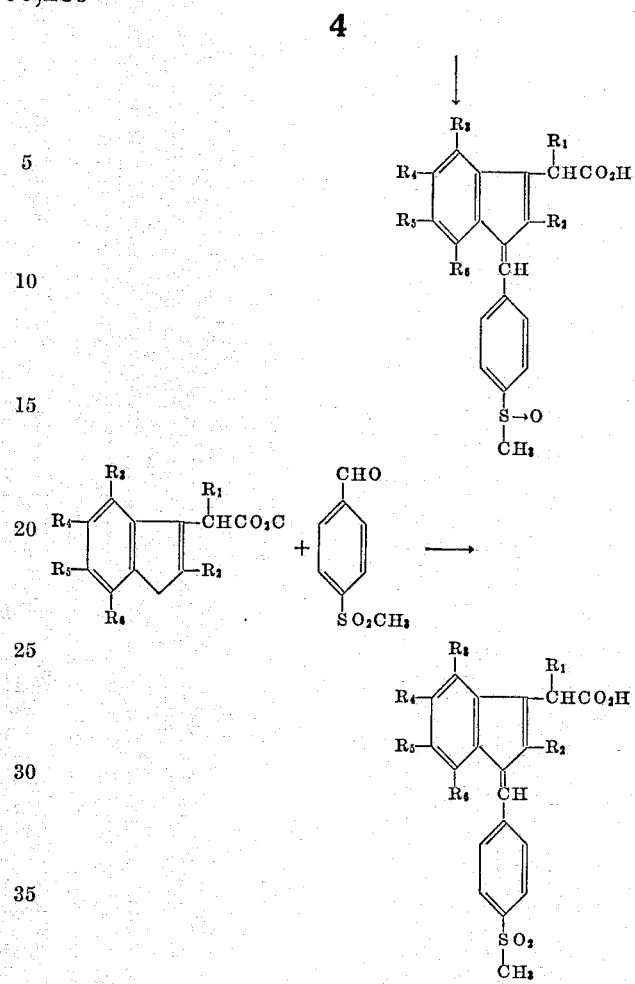

The following examples are presented to further illustrate the invention:

EXAMPLE 1

(A) Preparation of 3,4-difluoronitrobenzene (II)

In a 500-ml. flask equipped with a stirrer, thermometer and dropping funnel is charged 163 ml. of concentrated sulfuric acid. The acid is cooled to 0–5° C. and 64 ml. of 70% nitric acid is added at such a rate that the temperature does not exceed 25° C. To the cooled nitration mixture (10° C.) is added, dropwise and with agitation, 114 g. of o-difluorobenzene over a 2 hour period. The reaction mixture is maintained at 10–15° C. by ice bath cooling.

After complete addition the mixture is aged 0.5 hour at 10° C. and then one hour at room temperature. The mixture is poured into 200 grams of crushed ice and the resulting 2 phase system extracted with four 10 ml. portions of diethyl ether.

The ether extracts are extracted with 2 x 20 ml. of 10% aqueous potassium carbonate and 1 x 20 ml. of water. The ether layer is dried over 20 grams of sodium sulfate, filtered and the sodium sulfate washed with 2 x 30 ml. of ether. The filtrate is evaporated (120 mm.—40° C.) to remove the ether.

The residue is distilled giving 3,4-difluoronitrobenzene, B.P. 72–74° C. (4 mm.).

Preparation of 3-fluoro-4-methoxynitrobenzene

The above reactions of Example 1A are repeated except that the starting materials are o-fluoroanisole and nitric acid. Using the same reaction conditions and techniques there is obtained 3-fluoro-4-methoxynitrobenzene.

(B) Preparation of 3,4-difluoroaniline hydrochloride (III)

A solution of 139 g. of 3,4-difluoronitrobenzene in 170 ml. of ethanol is charged to a Parr low pressure (40 p.s.i.) hydrogenator. Raney nickel (2 tsp.) is added and the mixture shaken at 60° C. under 40 p.s.i. of hydrogen until hydrogen uptake ceases.

The catalyst is removed by filtration through Supercel®. The cake is washed with 2 x 50 ml. of ethanol.

The filtrate is concentrated (120 mm.—60° C.) to remove the solvent. The residue is dissolved in two liters of ether. The solution is cooled in an ice bath while hydrogen chloride is bubbled into the solution until precipitation is complete. Maximum temperature during hydrogen chloride addition is 15° C. The solution is filtered and the cake washed with 3 x 150 ml. of ether.

The product is dried at 40° C. (0.5 mm.) to give 3,4-difluoroaniline hydrochloride; M.P. 215–230° C. (dec.).

Alternatively, the residue may be used in the next step without isolation of the hydrochloride.

Preparation of 3-fluoro-4-methoxyaniline hydrochloride

The above reactions of Example 1B are repeated except that the starting materials are 3-fluoro-4-methoxynitrobenzene and hydrogen chloride. Using the same reaction conditions and techniques there is obtained 3-fluoro-4-methoxyaniline hydrochloride.

The above reactions of Example 1B are repeated using 2,4-difluoronitrobenzene and hydrogen chloride as starting materials. Using the same reaction conditions and techniquess there is obtained the corresponding aniline hydrochloride.

(C) Preparation of α-chloro-α-methyl-β-(3,4-difluorophenyl)-propionic acid

Into a 250-ml. flask equipped with a thermometer, dropping funnel, stirrer and connected to a wet test meter is charged 16.5 g. of 3,4-difluoroaniline hydrochloride, 20 ml. of water and 50 ml. of acetone. The mixture is cooled to 10° C. and 80 ml. of 6 N hydrochloric acid added at such a rate that the temperature does not exceed 30° C. The mixture is again cooled to 10° C. and 8.6 g. of methacrylic acid in 50 ml. of acetone and 4.3 g. of cupric chloride dihydrate in 33 ml. of water is added.

With the mixture maintained at 5–10° C., by ice bath cooling, a solution of 7.6 g. of sodium nitrite in 40 ml. of water is added dropwise over a 30-minute period. Nitrogen evolution occurred during the addition.

The reaction mixture is allowed to warm to room temperature over 0.5 hour and then aged with agitation at 25–30° C. until nitrogen evolution is complete (3 hours).

The reaction mixture is then concentrated in vacuo (18 mm.) to remove acetone, diluted with 100 ml. of water and extracted with ether (1 x 100 ml., 2 x 50 ml.). The combined ether extract is washed successively with 50 ml. of water and 3 x 75 ml. of a saturated sodium bicarbonate solution.

The bicarbonate extracts are combined, treated with 2 grams of Darco G-60, filtered and the cake washed with 30 ml. of water. The filtrate is cooled in an ice bath and concentrated hydrochloric acid cautiously added ($CO_2$ evolution) until precipitation of product is complete.

The product precipitates as an oil. Cooling results in partial solidification.

The water is decanted from the product and the residue slurried in 100 ml. of water.

The partially crystalline product is filtered and washed with water. The wet cake is dissolved in 50 ml. of ether and after removing 2–3 ml. of lower water phase the ether solution is dried over sodium sulfate and treated with 0.5 g. of Darco G-60. The solution is filtered and the cake washed with 10 ml. of ether. Evaporation of the filtration in vacuo gives α-chloro-α-methyl-β-(3,4-difluorophenyl)-propionic acid, M.P. 62–63° C.

Preparation of α-chloro-α-methyl-β-(3-fluoro-4-methoxyphenyl)-propionic acid

The above reactions of Example 1C are repeated except that the starting materials are 3-fluoro-4-methoxyaniline hydrochloride and methacrylic acid. Using the same reaction conditions and techniques there is obtained α-chloro-α-methyl-β-(3-fluoro-4-methoxyphenyl)-propionic acid.

The reactions of Example 1C are repeated using 2,4-difluoroaniline hydrochloride and methacrylic acid as starting materials. Using the same reaction conditions and techniques there is obtained the corresponding propionic acid derivative.

(D) Preparation of α-methyl-β-(3,4-difluorophenyl) propionic acid

A solution of 12.8 g. of potassium acetate in 200 ml. of 2BA-ethanol, 13.8 g. of α-chloro-α-methyl-β-(3,4-difluorophenyl)-propionic acid and 1.4 g. of 5% palladium on carbon is charged to a Parr low pressure (40 p.s.i.) hydrogenator.

The solution is shaken and heated to 45° C. Hydrogen uptake (quantitative) is complete in 2 hours. The catalyst is removed by filtration through Supercel® and washed with 2 x 20 ml. of 2BA-ethanol. The filtrate is evaporated (18 mm.—55° C.) to near dryness, diluted with 50 ml. of water and extracted with ether (1 x 50 ml., 3 x 15 ml.). The ether extracts are dried over magnesium sulfate, filtered and the cake washed with 2 x 10 ml. of ether. Evaporation of the filtrate (18 mm.—45° C.) gives an oil which solidifies. The last traces of acetic acid are removed by drying in vacuo (1 mm.—40° C.) giving α-methyl-β-(3,4-difluorophenyl)-propionic acid, M.P. 53–56° C.

The above reactions of Example 1D are repeated using the propionic acids produced in Example 1C as starting materials. Using the same reaction conditions and techniques there is obtained the corresponding β-aryl propionic acid.

(E) Preparation of 5-fluoro-6-methoxy-2-methylindanone

In a 840-ml. stainless steel bomb is placed 29 g. of α-methyl-β-(3-fluoro-4-methoxyphenyl)-propionic acid and 240 ml. of liquid hydrogen fluoride. The sealed bomb is heated for 12 hours at 60° C., cooled to room temperature and held for 7 hours.

The hydrogen fluoride is removed by evaporation in the hood. The residue is dissolved in 450 ml. of benzene and extracted with 2 x 25 ml. of 45% aqueous potassium carbonate solution followed by 2 x 25 ml. water extraction.

The benzene layer is dried over magnesium sulfate, filtered and the cake washed with 20 ml. of benzene.

The filtrate is treated with 3 g. of Darco® G-60 for 15 minutes, filtered and the carbon cake washed with 2 x 10 ml. of benzene. The filtrate is evaporated (18 mm.—50° C.) to a constant weight, yielding 5-fluoro-6-methoxy-2-methylindanone.

Preparation of 5,6-difluoro-2-methylindanone

The above reactions of Example 1E are repeated except that the starting materials are α-methyl-β-(3,4-difluorophenyl)-propionic acid and hydrogen fluoride. Using the same reaction conditions and techniques as in Example 1E there is obtained the corresponding indanone.

(F) Preparation of 5,7-difluoro-2-methyl-indenyl-3-acetic acid

To a 25 ml. flask equipped with a magnetic stirrer, exit tube to wet test meter, thermometer and Dean-Stark trap (20 cc. capacity) is charged 4.54 grams of 4,6-difluoro-2-methylindanone, 2.34 g. of cyanoacetic acid, 1.5 g. acetic acid 0.385 g. ammonium acetate and 4 ml. of toluene. The Dean-Stark trap is filled with toluene and the mixture refluxed (122–130° C.) with agitation for 22 hours. After 8 hours of reflux an additional 0.3 g. of acetic acid, 0.1 g. of ammonium acetate and 2 ml. of toluene is added.

The aqueous phase (0.4 ml.) and 2.1 ml. of toluene is removed from the Dean-Stark trap. The reaction mixture is then refluxed at 130° C. for 8 hours.

The reaction mixture is cooled and the solvent removed in vacuo (20–30 mm.) at 40–45° C. The residue is dissolved in 13 ml. of 2B-ethanol and adjusted to pH 11.0 and 2 N aqueous potassium hydroxide solution (~3 ml.). An additional 5.38 g. of 85% potassium hydroxide dissolved in 33 ml. of water is added and the reaction mixture refluxed for 13 hours. A very slow stream of nitrogen is swept through the system during the entire hydrolysis.

The reaction mixture is cooled to 35° C. and the ethanol removed in vacuo (18 mm.). Water (100 ml.) is added to the concentrate and the mixture extracted with 2 x 40 ml. of toluene. The aqueous layer is heated at 50° C. in vacuo (18 mm.) to remove the residual toluene. The solution is then agitated for 15 minutes with 0.2 g. of Darco G-60, filtered and the carbon washed with 10 ml. of water. The filtrate is cooled to 5° C. and the pH adjusted to 2.0 by the addition of 6 N hydrochloric acid. The acidified mixture is aged one hour at 5° C., filtered and the cake washed with cold water to yield 5,7-difluoro-2-methylindenyl-3-acetic acid.

Preparation of 5-methoxy-6-fluoro-2-methylindenyl-3-acetic acid

The above reactions of Example 1F are repeated except that the starting materials are 5-fluoro-6-methoxy-2-methylindanone and cyanoacetic acid. Using the same reaction conditions and techniques there is obtained 5-methoxy-6-fluoro-2-methylindenyl-3-acetic acid.

Preparation of α-(5-methoxy-6-fluoro-2-methylindenyl)-3-propionic acid

The reactions of Example 1F are repeated except that the starting materials are 5-fluoro-6-methoxy-2-methylindanone and α-cyanopropionic acid. Using the same reaction conditions and techniques there is obtained α-(5-methoxy-6-fluoro-2-methylindenyl)-3-propionic acid.

(G) Preparation of p-methylsulfinylbenzaldehyde

In a 250-ml. flask equipped with an agitator is placed 13.65 g. of p-methylthiobenzaldehyde and 90 ml. of isopropyl alcohol. The mixture is cooled to 5° C. and 20.65 g. of 30% hydrogen peroxide is added. The mixture is warmed to room temperature and stirred for 17 hours. At the end of this time vpc analysis showed 0.41 g. (3%) of unreacted mercaptan.

The excess hydrogen peroxide is destroyed by the slow (0.5 hour) addition of 40 ml. of an aqueous solution containing 7.2 g. of sodium bisulfite. The reaction mixture is concentrated in vacuo (18 mm.) to near dryness.

Hydrochloric acid (120 ml.—2NHCl) is added and the mixture refluxed under a nitrogen atmosphere for 1 hour, then cooled to room temperature. The acidic reaction mixture is filtered and the solid washed with 50 ml. of chloroform and dried in vacuo (1 mm.) at 40° C., 1.9 g. (11%), M.P. 220–221° C.

The filtrate is transferred to a separatory funnel and the layers separated. The aqueous layer is extracted twice with 50 ml. portions of chloroform. The chloroform extracts are combined, and evaporated in vacuo (18 mm.—40° C.). The residue is dissolved in 40 ml. of hot carbon tetrachloride, cooled to 0–5° C., aged 2 hours, filtered and washed with 2 x 5 ml. of cold carbon tetrachloride. The product was dried in vacuo at 30° C. yielding p-methylsulfinylbenzaldehyde, M.P. 89–90° C.

p-Methylsulfonylbenzaldehyde may be prepared by the addition of sodium periodate to p-methylsulfinylbenzaldehyde in acetone solution. The mixture is heated, filtered and the solid dried in vacuo to yield p-methylsulfonylbenzaldehyde.

(H) Preparation of cis-5,6-difluoro-1-(p-methylsulfinylbenzylidene)-2-methylindenyl-3-acetic acid To a 100-ml. flask equipped with a stirrer, condenser and a nitrogen inlet tube is charged 10 ml. of methanol, 2.5 ml. water and 1.32 g. of 85% potassium hydroxide. The system is purged with nitrogen. After complete dissolution of the caustic, 2.24 g. of 5,6-difluoro-2-methylindenyl-3-acetic and 2.10 g. of p-methylsulfinylbenzaldehyde is charged. The mixture is heated at 60–62° C. for 3 hours in a nitrogen atmosphere.

The mixture is poured into 80 ml. of water and extracted with 3 x 20 ml. of toluene. The water phase is treated with 0.5 g. of Darco G-60 for 15 minutes, filtered and the carbon washed with 2 x 10 ml. of water. The filtrate is added to 3.4 ml. of 6 N hydrochloric acid at 0–5° C. The mixture is filtered and the solid washed with cold water and dried, M.P. 165–195° C.

U.V. (MeOH—HCl) λmax.=322 mµ. (E% 265), 287 (425), 266 (455), 220 (480).

A portion of the residue (3.9 g.) is refluxed for 1 hour in 90 ml. of benzene. The hot benzene solution is filtered and the solid washed with 2 x 20 ml. of hot benzene. The solid is air dried at 50° C. to give crude product, M.P. 198–203° C.

2.3 grams of crude product is dissolved in 90 ml. of boiling methanol. The solution is slowly (2 hours) cooled to 0–5° C., filtered and the solid washed with a minimum of cold methanol. The product is dried in vacuo (1 mm.) at 80° C. yielding cis-5,6-difluoro-1-(p-methylsulfinylbenzylidene) - 2 - methylindenyl-3-acetic acid, M.P. 209–211° C.

The reactions of Example 1H are repeated using as starting materials the indenyl-3-acetic acids and α-methyl-(5 - methoxy-6-fluoro-2-methylindenyl)-3-acetic acids of Example 1F to obtain the corresponding 1-(p-methylsulfinylbenzylidene)-indenyl-3-acetic acid compounds or they may be reacted with p-methylsulfonylbenzaldehyde to produce the corresponding 1-(p-methylsulfonylbenzylidene)-indenyl-3-acetic acid compounds.

EXAMPLE 2

(A) p-Fluoro-α-methylcinnamic acid

Into a 2.0-liter round-bottom flask fitted with stirrer, thermometer, reflux condenser and nitrogen inlet tube is charged 303.5 g. (2.45 moles) of p-fluorobenzaldehyde, 479 g. (3.68 moles) of propionic anhydride and 236 g. (2.47 moles) of sodium propionate. The contents of the flask are heated gradually (over a two hour period) to 140° (internal temperature) in an oil bath. The batch is heated at 140° for 20 hours (bath maintained at 160° with Thermowatch control), cooled to 100° and poured into 12.2 liters of water. A precipitate is formed which is dissolved with the addition of a solution of 458 g. of 85% potassium hydroxide pellets in 3.02 liters of water. The batch is extracted with 3 x 3.46 liters of ethyl ether and the combined ether extracts are back-washed with 2 x 865 ml. of 2 N aqueous potassium hydroxide solution. The combined aqueous alkaline fractions are filtered through a Supercel pad and acidified to pH=1 with 1.22 liters of concentrated hydrochloric acid. The temperature range is 25–30°; no external cooling is needed. After aging for one hour at room temperature, the solids are filtered, washed with 4 x 692 ml. of water (25°) and dried in vacuo at 50° to yield product, M.P. 150–151°.

(B) p-Fluoro-α-methylhydrocinnamic acid p-Fluoro-α-methylcinnamic acid (132 g., 0.735 mole) is dissolved in 2.69 liters of 2BA ethanol and hydrogenated in the presence of 8.1 g. of 5% palladium on charcoal catalyst at 40 p.s.i.g. and at room temperature. Hydrogen uptake ceases at 101% in 70 minutes. The catalyst is filtered through Supercel and is washed with 2BA ethanol. The filtrate plus washes are concentrated in vacuo to a viscous oil and pumped free of solvent.

(C) 5-fluoro-2-methylindanone

Into a 3.0-liter round bottom flask fitted with stirrer and thermometer is charged 1340 g. of polyphosphoric acid which is then heated to 70°. One hundred thirty-four grams (134 g., 0.735 mole) of p-fluoro-α-methylhydrocinnamic acid is added over five minutes. The reaction mixture is heated for one hour at 95°, cooled to room temperature and poured into 2.98 liters of water. After cooling to room temperature with addition of ice the aqueous solution is extracted with 3 x 1.48 liters of ethyl ether. The combined ether extracts are washed, successively, with 2 x 690 ml. of saturated sodium chloride solution, 2 x 690 ml. of 5% sodium bicarbonate solution and 2 x 690 ml. of water. The ether layer is dried over anhydrous magnesium sulfate and concentrated in vacuo to dryness.

(D) 5-fluoro-2-methylindene-3-acetic acid

Into a 3.0-liter round-bottom flask fitted with stirrer, reflux condenser and Dean-Stark trap is charged 116 g. (0.708 mole) of 5-fluoro-2-methylindanone, 66.6 g. (0.785 mole) of cyanoacetic acid, 41.8 g. of glacial acetic acid, 10.9 g. of amonium acetate and 98.5 ml. of azeotropically dried toluene. The reaction mixture is refluxed for 21 hours, collecting the water which separated in the Dean-Stark trap. The reaction mixture is concentrated in vacuo to dryness (residue, 150 g.). The residue is blanketed with nitrogen and dissolved in 378 ml. of 2BA ethanol (warm). To it is added 88.5 ml. of 2.2 N potassium hydroxide solution, followed by a solution of 138 g. of 85% potassium hydroxide pellets in 945 ml. of water. The reaction mixture is refluxed for 16 hours (under nitrogen). The batch is concentrated in vacuo to dryness and the residue treated with 3.17 liters of water. The insolubles are extracted into 4 x 17 liters of ethyl ether and the aqueous layer then treated with 12.3 g. of Darco G–60 and heated to boiling. Supercel is added to the boiling mixture, the batch filtered through a Supercel pad, cooled to 25° and acidified (pH 2) with 675 ml. of 6 N hydrochloric acid. The product is precipitated and the batch cooled to 10°, filtered and washed with 2 x 232 ml. of cold water. Two liters of benzene is added to the wet cake and water is removed azeotropically at atmospheric pressure. An additional 1.0 liter of benzene is added during the azeotroping. When all water is removed, as judged by the vapor temperature rising from 70 to 80°, the final benzene volume is adjusted to 780 ml. The batch is cooled to 10° and filtered. The solids are washed with 3 x 100 ml. cold (10°) benzene and the cake dried in vacuo at 50° to yield product, M.P. 159–167°.

(E) Cis-5-fluoro-2-methyl-1-[(p-methylsulfinyl)benzylidene]indene-3-acetic acid

Into a 1.0 liter round-bottom flask fitted with stirrer, thermometer, reflux condenser and nitrogen-inlet is charged 46.9 g. of 85% potassium hydroxide pellets, 89 ml. of water and 356 ml. of methanol. The resulting solution is cooled at 25° (under nitrogen) and then 73.5 g. (3.58 moles) of 5-fluoro-2-methylindene-3-acetic acid and 75 g. (4.48 moles) of p-methylsulfinylbenzaldehyde are added. The reaction mixture is heated to 60–62° (oil bath) and that temperature maintained for 3 hours (Thermowatch). The batch is cooled to 25° and poured into 2.87 liters of water. The aqueous solution is extracted with 3 x 735 ml. of toluene and the residual toluene is removed from the aqueous layer in vacuo. The aqueous layer is cooled to 0–5° and acidified (pH 2) with the addition of 129 ml. of 6 N hydrochloric acid. The crude product precipitates. The batch is aged at 0–5° for ½ hour, filtered and washed with 2 x 214 ml. of ice water. Five liters of benzene are added to the wet cake and water removed by atmospheric azeotropic distillation. The final benzene volume is adjusted to 1.9 liters and the mixture cooled at 25°. The solids are filtered, washed with 2 x 190 ml. of benzene and dried in vacuo on the funnel. This material is heated to boiling in 600 ml. of 2BA ethanol and filtered (hot) through a Supercel pad. The solution is concentrated, in vacuo, to a 393 ml. volume and allowed to stand until beginning of crystallization. The mixture is then cooled to 0°, aged at 0° for one hour and the solids filtered. After washing with 3 x 40 ml. of ice-cold 2BA ethanol, the product is dried in vacuo at 80°, M.P. 182–187°.

Analysis.—Cal'd. for $C_{20}H_{17}O_3FS$ (percent): C, 67.40; H, 4.81; S, 9.00. Found (percent): C, 67.34; H, 4.88; S, 9.30.

What is claimed is:

1. A process for preparing a 1-aryl-3-indenyl acetic acid compound of the formula:

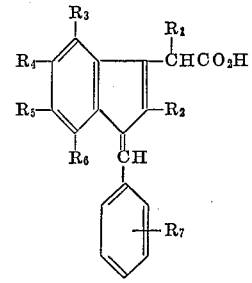

wherein $R_1$ may be hydrogen, loweralkyl or halololoweralkyl; $R_2$ is hydrogen or loweralkyl; $R_3$, $R_4$, $R_5$ and $R_6$ each may be hydrogen, loweralkyl, loweralkoxy or halogen and $R_7$ may be loweralkylsulfinyl or lower alkylsulfonyl which comprises:

(a) nitrating a compound of the formula:

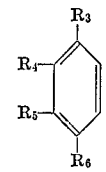

to form the corresponding nitrobenzene;
(b) reducing the said nitrobenzene to form an aniline derivative;
(c) diazotizing the aniline compound, to form the corresponding diazonium salt;
(d) reacting the diazonium salt with an acrylic acid to produce a α-halo-β-aryl-propionic acid compound of the formula:

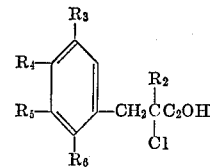

(e) catalytically hydrogenolyzing the α-halo-β-aryl propionic acid to produce a β-aryl propionic acid;
(f) ring closing the β-aryl propionic acid to form an indanone;
(g) condensing the indanone with a cyanoaliphatic acid, to form a 3-indenyl aliphatic acid;
(h) reacting the resulting 3-indenyl aliphatic acid with a benzaldehyde to produce the desired 1-aryl-3-indenyl acetic acid compound.

2. A process as in claim 1 wherein $R_1$ is hydrogen, $R_2$ is methyl, $R_3$ is hydrogen, $R_4$ is fluoro, $R_5$ is hydrogen, $R_6$ is hydrogen and $R_7$ is methylsulfinyl.

3. A process as in claim 2 wherein Step H, the benzaldehyde is p-methylsulfinylbenzaldehyde.

4. A process as in claim 3 wherein Step H is carried out in the presence of a base.

5. A process as in claim 4 wherein the base is potassium hydroxide.

References Cited

UNITED STATES PATENTS 3,532,752   10/1970   Shen ............ 260—515 A
3,472,646   10/1969   Eue et al. ......... 260—515

OTHER REFERENCES

Theilheimer: "Synthetic Methods," vol. 13 (1959), p. 69.

Theilheimer: "Synthetic Methods," vol. 15 (1961), pp. 82–3.

Noller: "Chem. of Org. Compounds," Saunders Co., Philadelphia (1965), pp. 531–2.

JAMES A. PATTEN, Primary Examiner

U.S. Cl. X.R.

260—515 R, 515 N, 520, 521 R, 521 A, 578, 580, 590, 599, 612 D, 646; 424—317

UNITED STATES PATENT OFFICE
CERTIFICATE OF CORRECTION

Patent No. 3,766,259  Dated  October 16, 1973

Inventor(s) Meyer Sletzinger and Donald F. Reinhold

It is certified that error appears in the above-identified patent and that said Letters Patent are hereby corrected as shown below:

The formula in Claim 1 under (d) which is as follows:

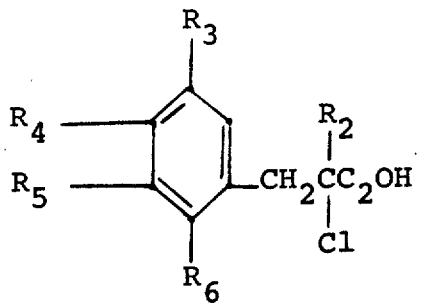

should be:

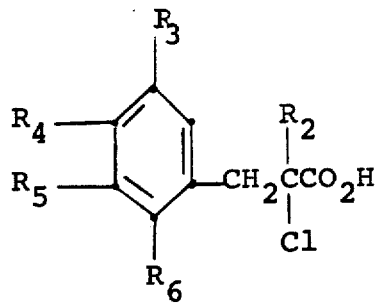

Signed and sealed this 12th day of March 1974.

(SEAL)
Attest:

EDWARD M. FLETCHER, JR.
Attesting Officer

C. MARSHALL DANN
Commissioneroof Patents